United States Patent
Middlebrooks et al.

(10) Patent No.: US 10,706,534 B2
(45) Date of Patent: Jul. 7, 2020

(54) METHOD AND APPARATUS FOR CLASSIFYING A DATA POINT IN IMAGING DATA

(71) Applicants: Scott Anderson Middlebrooks, Beaverton, OR (US); Henricus Wilhelm van der Heijden, Turnhout (BE); Adrianus Cornelis Koopman, Hilversum (NL)

(72) Inventors: Scott Anderson Middlebrooks, Beaverton, OR (US); Henricus Wilhelm van der Heijden, Turnhout (BE); Adrianus Cornelis Koopman, Hilversum (NL)

( * ) Notice: Subject to any disclaimer, the term of this patent is extended or adjusted under 35 U.S.C. 154(b) by 147 days.

(21) Appl. No.: 15/660,568

(22) Filed: Jul. 26, 2017

(65) Prior Publication Data
US 2019/0035075 A1    Jan. 31, 2019

(51) Int. Cl.
G06K 9/62    (2006.01)
G06T 7/00    (2017.01)

(52) U.S. Cl.
CPC ........ G06T 7/0012 (2013.01); *G06T 2200/04* (2013.01); *G06T 2207/10081* (2013.01); *G06T 2207/20081* (2013.01); *G06T 2207/20084* (2013.01); *G06T 2207/30064* (2013.01)

(58) Field of Classification Search
CPC . G06T 2207/10081; G06T 2207/20081; G06T 2207/20084; G06T 7/0012
See application file for complete search history.

(56) References Cited

U.S. PATENT DOCUMENTS

| | | | |
|---|---|---|---|
| 6,754,380 B1* | 6/2004 | Suzuki | G06K 9/32 382/156 |
| 2003/0161522 A1* | 8/2003 | Campanini | G06T 7/0012 382/132 |
| 2005/0010445 A1* | 1/2005 | Krishnan | G06F 19/321 705/2 |
| 2011/0075920 A1* | 3/2011 | Wu | G06K 9/4638 382/160 |
| 2017/0018076 A1* | 1/2017 | Middlebrooks | G06K 9/6267 |
| 2017/0046616 A1* | 2/2017 | Socher | G06N 3/088 |
| 2017/0193657 A1* | 7/2017 | Madabhushi | G06N 3/08 |
| 2018/0144465 A1* | 5/2018 | Hsieh | G06T 7/0012 |
| 2019/0197358 A1* | 6/2019 | Madani | G06K 9/6259 |
| 2019/0197368 A1* | 6/2019 | Madani | G06K 9/66 |
| 2019/0198156 A1* | 6/2019 | Madani | G16H 50/70 |
| 2019/0258878 A1* | 8/2019 | Koivisto | G06N 3/0445 |
| 2019/0259474 A1* | 8/2019 | Wang | G16C 20/30 |
| 2019/0287685 A1* | 9/2019 | Wu | G06F 17/277 |

OTHER PUBLICATIONS

Wu, Jiajun, et al. "Learning a Probabilistic Latent Space of Object Shapes via 3D Generative-Adversarial Modeling." Neural Information Processing Systems, 2016, pp. 82-90. (Year: 2016).*

* cited by examiner

*Primary Examiner* — Ian L Lemieux

(57) ABSTRACT

The invention provides a method and device for creating a model for classifying a data point in imaging data representing measured intensities, the method comprising:
  training a model using a first labelled set of imaging data points;
  determining at least one first image part in the first labelled set which the model incorrectly classifies;
  generating second image parts similar to at least one image part;
  further training the model using the second image parts.
Preferably the imaging data points and the second image parts comprise 3D data points.

13 Claims, 5 Drawing Sheets

METHOD AND APPARATUS FOR CLASSIFYING A DATA POINT IN IMAGING DATA

FIELD OF THE DISCLOSURE

The disclosure relates to computer-aided diagnosis (CAD). The disclosure also relates to a method and a platform or system for using machine learning algorithms for CAD.

BACKGROUND OF THE DISCLOSURE

Advances in computed tomography (CT) allow early detection of cancer, in particular lung cancer which is one of the most common cancers. As a result, there is increased focus on using regular low-dose CT screenings to ensure early detection of the disease with improved chances of success of the following treatment. This increased focus leads to an increased workload for professionals such as radiologists who have to analyze the CT screenings.

To cope with the increased workload, computer-aided detection (CADe) and computer-aided diagnosis (CADx) systems are being developed. Hereafter both types of systems will be referred to as CAD systems. CAD systems can detect lesions (e.g. nodules) and subsequently classify them as malignant or benign. A classification need not be binary, it can also include a stage of the cancer. Usually, a classification is accompanied with a confidence value as calculated by the CAD system.

CAD systems typically follow a number of general steps. In an optional first step, the input imaging data is segmented, for example to distinguish lung tissue from the background signal. Then, regions of interest are identified, for example all lung tissue with nodule-like forms in them. It is also possibly to simply examine every data point, without a pre-selection of region of interest. For a selected data point a number of input values is calculated, the so-called feature vector. This feature vector is used as input in a decision function, which projects the feature vector to a classification.

Hereafter the term "model" will be used to indicate a computational framework for performing one or more of a segmentation and a classification of imaging data. The segmentation, identification of regions of interest, and/or the classification may involve the use of a machine learning (ML) algorithm. The model comprises at least one decision function, which may be based on a machine learning algorithm, which projects the input to an output. For example, a decision function may project a feature vector to a classification outcome. Where the term machine learning is used, this also includes further developments such as deep (machine) learning and hierarchical learning.

An example of a suitable model is the convolutional neural network (CNN), which is primarily used in computer vision fields. For the case of two dimensional (2D) images, 2D CNN has been widely used in many applications. The principles of 2D CNNs can, however, also be extended to process three dimensional (3D) images such as the earlier mentioned medical imaging data.

Whichever type of model is used, suitable training data needs to be available to train the model. In many applications, there is not enough training data available or the available data is not fully representative of the problem field. For example, in the case of training data to detect nodules there may not be enough samples of a particular type of nodule, leading to a trained model which is not capable to reliably detect that type of nodule.

SUMMARY OF THE DISCLOSURE

It is an object of this disclosure to provide a method and apparatus for classifying structures in imaging data which addresses at least one of the above drawbacks.

The disclosure provides a method for creating a model for classifying a data point in imaging data representing measured intensities, the method comprising:
training a model using a first labelled set of imaging data points;
determining at least one first image part in the first labelled set, preferably a first image part which the model incorrectly classifies;
generating second image parts similar to at least one image part;
further training the model using the second image parts.

In an embodiment, the model is a convolutional neural network (CNN).

In an embodiment, the imaging data is 3-dimensional (3D) pixel data and the second image parts comprise 3D pixel data. The model, which can be a 3D CNN operates on 3D pixel data. In an alternative embodiment, the model operates on 2D slices of the 3D pixel data.

In an embodiment, the model classifies essentially every point in the imaging data. This would remove the need for a segmentation of the imaging data which could lead to classification errors due to erroneous segmentation.

In an embodiment, the second image parts are generated by a generator model taking a latent vector as input. Such a generator model can be an Generative Adversarial Network (GAN), preferably (in the case of 3D data), a 3D GAN.

In an embodiment, the latent vector is determined corresponding to image part properties of interest. In an embodiment, the at least one first image part in the first labelled set which the model incorrectly classifies, is classified as a false negative.

The disclosure further provides a computation device, configured to implement the above described methods. The disclosure further provides a non-transitory computer readable medium comprising computer instructions for implementing the methods according the disclosure.

BRIEF DESCRIPTION OF THE FIGURES

Embodiments of the present disclosure will be described hereinafter, by way of example only, with reference to the accompanying drawings which are schematic in nature and therefore not necessarily drawn to scale. Furthermore, like reference signs in the drawings relate to like elements.

DETAILED DESCRIPTION

Figure 1:
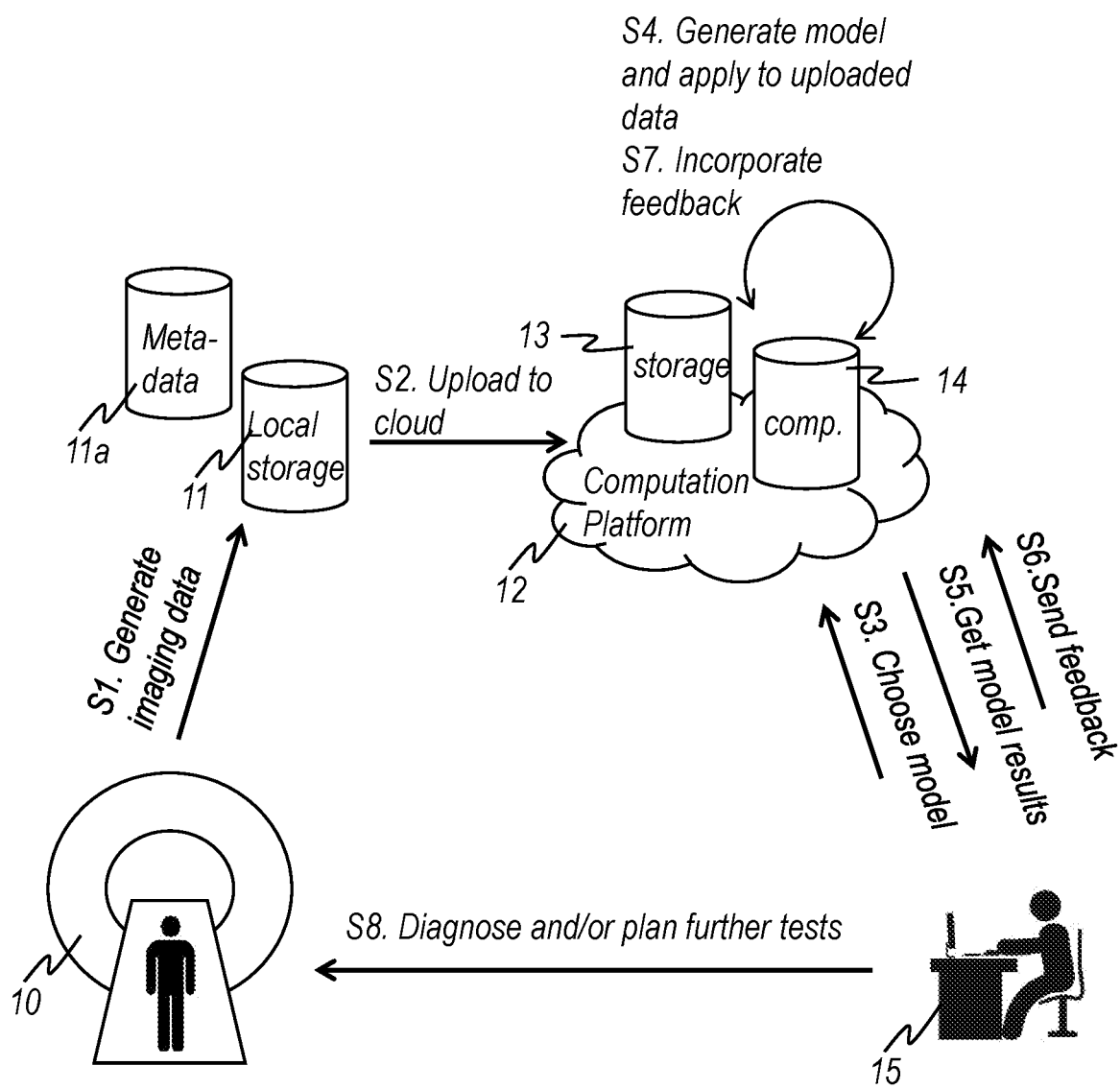
FIG. 1 schematically shows an overview of a workflow according to embodiments of the disclosed subject matter.
Figure 2:
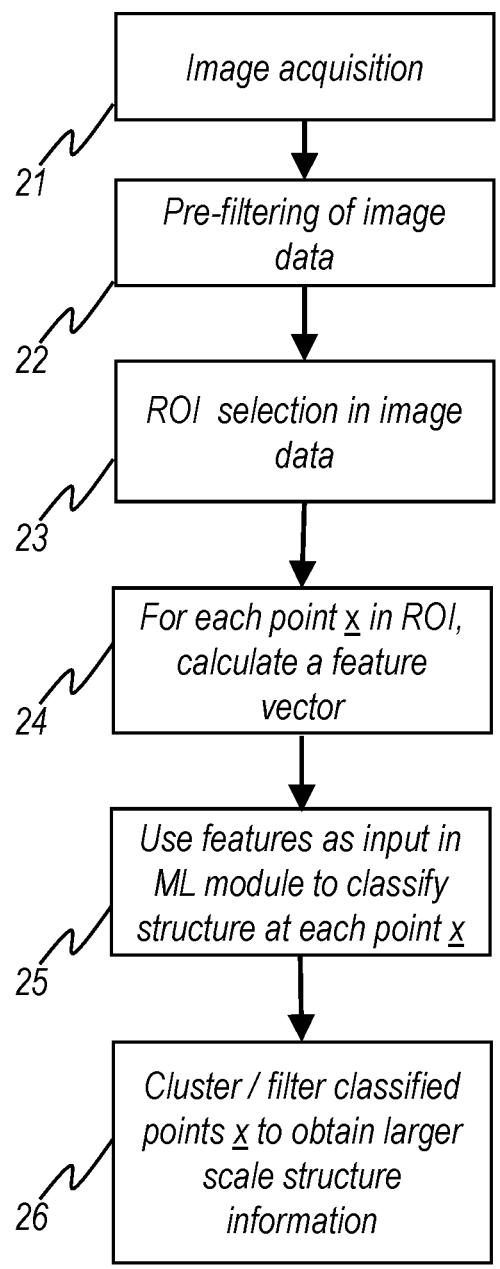
FIG. 2 schematically shows a flow chart according to embodiments of the disclosed subject matter.

FIG. 2 schematically shows an overview of a workflow according to embodiments of the disclosed subject matter. A patient is scanned in scanning device 10. The scanning device 10 can be any type of device for generating diagnostic image data, for example an X-Ray device, a Magnetic Resonance Imaging (MRI) scanner, or any general Computed Tomography (CT) device. Of particular interest are low-dose X-Ray devices for regular and routine scans. The various types of scans can be further characterized by the use of a contrast agent, if any. The image data is typically three-dimensional (3D) data in a grid of intensity values, for example 512×512×256 intensity values in a rectangular grid.

In the following, the example of a CT device, in particular a CT device for low dose screenings, will be used. However, this is only exemplary. Aspects of the disclosure can be applied to any instantiation of imaging modality, provided that it is capable of providing imaging data. A distinct type of scan (X-Ray CT, low-dose X-Ray CT, CT with contrast agent X) can be defined as a modality.

The images generated by the CT device 10 (hereafter: imaging data) are sent to a storage 11 (step S1). The storage 11 can be a local storage, for example close to or part of the CT device 10. It can also be part of the IT infrastructure of the institute that hosts the CT device 10. The storage 11 is convenient but not essential. The data could also be sent directly from the CT device 10 to computation platform 12.

All or parts of the imaging data is then sent to the computation platform 12 in step S2. In general it is most useful to send all acquired data, so that the computer models of platform 12 can use all available information. However, partial data may be sent to save bandwidth, to remove redundant data, or because of limitations on what is allowed to be sent (e.g. because of patient privacy considerations). The data sent to the computation platform 12 may be provided with metadata from scanner 10, storage 11, or further database 11a. Metadata can include additional data related to the imaging data. For example statistical data of the patient (gender, age, medical history) or data concerning the equipment used (type and brand of equipment, scanning settings, etc).

Computation platform 12 comprises one or more storage devices 13 and one or more computation devices 14, along with the necessary network infrastructure to interconnect the devices 13, 14 and to connect them with the outside world, preferably via the Internet. It should be noted that the term "computation platform" is used to indicate a convenient implementation means (e.g. via available cloud computing resources). However, embodiments of the disclosure may use a "private platform", i.e. storage and computing devices on a restricted network, for example the local network of an institution or hospital. The term "computation platform" as used in this application does not preclude embodiments of such private implementations, nor does it exclude embodiments of centralized or distributed (cloud) computing platforms.

The imaging data is stored in the storage 13. The central computing devices 14 can process the imaging data to generate feature data as input for the models. The computing devices 14 can segment imaging data. The computing devices 14 can also use the models to classify the (segmented) imaging data. More functionality of the computing devices 14 will be described in reference to the other figures.

A work station 15 for use by a professional, for example a radiologist, is connected to the computation platform 12. Hereafter, the terms "professional" and "user" will be used interchangeably. The work station 15 is configured to receive data and model calculations from the computation platform, and to send instructions and feedback to the computation platform 12. The work station 15 can visualize received raw data and model results.

In step S3, the professional selects a basal model (or in general: specifies model parameters) for use in a calculation. More exemplary details concerning basal models are provided in reference to FIG. 9. Based on the entered model parameters, in step S4 the platform 12 generates the model (if needed—the model may be already cached), performs the needed calculations for training the model (if needed—training data for the model may already be available in the computation platform 12), and applies the model to the imaging data that was received in step S2. In general, the computation platform will use stored results for calculations that have been performed earlier (i.e. calculated image features, model training data) and only perform the calculations it has not done before. This way, the professional accessing the computation platform 12 using the work station 15 can have a fast response to his or her instructions.

The result of the model calculations, for example a segmentation of the imaging data and/or classification of data points, is sent to the professional in step S5. The received data is visualized on the work station 15. The professional will examine the results and prepare feedback in step S6. Feedback may for example be that, in the professional's opinion, the presented classification is correct or incorrect. Other types of feedback are also available in exemplary embodiments, for example: the professional can confirm or correct the basic classification (e.g. malignant or benign) and also add further information, for example a stage of the cancer in case of a malign classification. In this manner, the feedback information can be used to enrich the classified feature vectors so that at a later stage more sophisticated models can be trained.

The feedback from step S6 is sent to the computation platform 12. In step S7, the computation platform 12 incorporates the feedback in its own data. For example, if the feedback is of the correct/incorrect or malignant/benign type, the model results and the feedback can be added as ground truths for further training. Along with the feedback, the source of the feedback may also be stored. That makes it possible to train future models using only feedback from selected sources. For example, the professional can request models that are only trained using his own data or data from close colleagues (e.g. "trusted data"). Instead or in addition to this, the feedback can be used incrementally adjust the decisions functions of the model. The feedback can be used only in one or more selected decision functions, again to insure that models are trained using data from known and trusted sources.

FIG. 2 schematically shows a flow chart according to embodiments of the disclosed subject matter. In step 21, the imaging data (e.g. CT data) is acquired. Optionally, the imaging data is pre-filtered in step 22, for example by applying a noise reduction filter. In optional step 23, regions of interest (ROIs) are selected. This step may comprise segmenting the data, e.g. segmenting the lung area from other areas. It is also possible to skip the segmenting and/or ROI selection altogether, and simply attempt to classify every data point in the imaging data. A data point in this context is typically a "voxel"—an intensity (I) value at a point (x,y,z) in the space. However, the use of multi-dimensional (multi-modal) data is also possible.

In step 24, for each point (x, y, z) a feature vector is calculated. In step 25, the features are formed as input in a decision function of a trained Machine Learning model, in order to classify point x. It is noted that an explicit description on the manner in which the ML model may be trained using said features is omitted in this disclosure, since the general principles of ML model training are known to a skilled person.

Finally, in step 26, after all data points have been classified, a processing step can be performed to cluster the data points into larger scale structures. For example, nearby points classified as nodules or vessels are combined into a single nodule or vessel. Filtering may be performed to eliminate errors and outliers.

Figure 3:
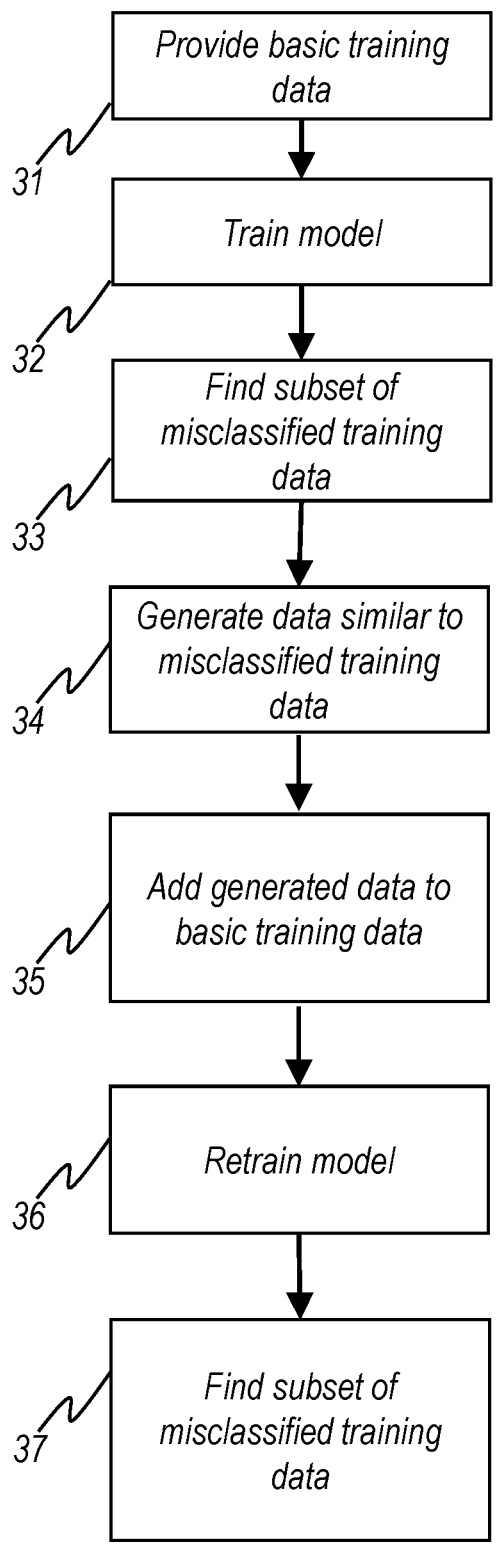
FIG. 3 schematically shows a further flow chart according to embodiments of the disclosed subject matter.

FIG. 3 shows a schematic overview of a method according an embodiment of the invention. In step 31, a model, such as a 3D Convolutional Neural Network (CNN), is provided with basic training data. The training data comprises a number of 3D volume data with intensity data, that is, an intensity I value for a number of (x,y,z) points. The training data may be labelled with labels, such as "malignant nodule" and "benign nodule". These labels are typically manually added by a trained professional. Instead of a 3D CNN, another model can be used.

In step 32, the model is trained using the basic training data. After the training, the training set is evaluated using the trained module. In step 33, the subset of training data with labels that were misclassified by the model is provided to a generator module. In step 34, the generator generates data that is similar to the provided misclassified training data.

The generator can use a Generative Adversarial Network (GAN) model. The generated data is added as additional training data to the basic training data in step 35. In step 36, the model is re-trained so that the model becomes trained on both the basic training data and the generated data set. The basic training data is then provided to the re-trained model, in order to determine if the accuracy has improved, in step 37. Steps 34-37 may be repeated a number of times until the model is sufficiently accurate on the basic training set.

Other types of data generating models can be used as well, such as Deep Convolutional Generative Adversarial Networks (DCGAN). GANs and DCGANs are described for example in "Unsupervised representation learning with deep convolutional generative adversarial networks" by Radford, Metz and Chintala, to be published as ICLR 2016 contribution. GANs have been generalized for 3D generation, see for example "Learning a Probabilistic Latent Space of Object Shapes via 3D Generative-Adversarial Modeling" by Wu et al, published in 2016 at the 29th Conference on Neural Information Processing System.

Further example are Pixel Recurrent Neural Networks (PixelRNN) and Pixel Convolutional Neural Networks (PixelCNN). These models generate 2D images pixel by pixel or 3D data voxel by voxel and are described in "Pixel Recurrent Neural Networks" by Van den Oord, Karchbrenner and Kavukcuoglu, Proceedings of the $33^{rd}$ International Conference on Machine Learning (2016).

In general, the model will work on 3D data, so the generated data should also be 3D data. It is also possible to let the model work on 2D slice data (from the 3D data set) and to generate further 2D data sets.

It is preferable that only basic training data is used in step 34 as a basis to generate similar data. However, it is possible to generate further data starting from generated data.

Figure 4:
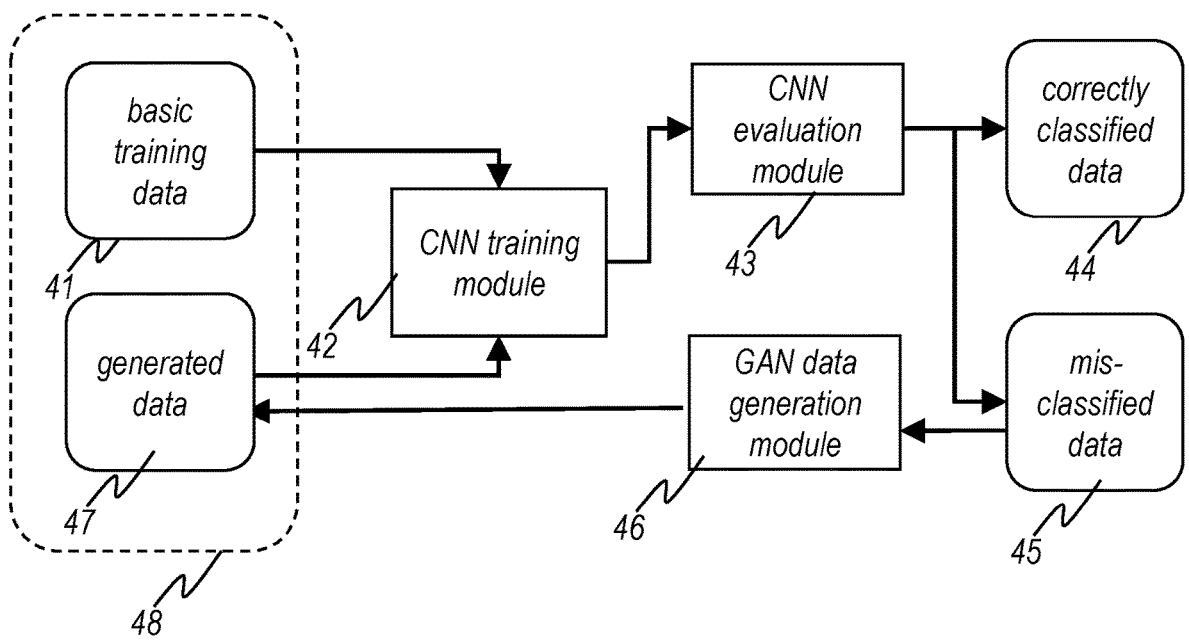
FIG. 4 schematically shows a system according to embodiments of the disclosed subject matter.

FIG. 4 shows an example implementation of the method described in connection with FIG. 3. The basic training data 41 is provided to a model training module 42. This can be any module, but the invention can be advantageously applied to Convolutional Neural Networks (CNNs), in particular 3D CNNs. In the present example, 42 represents a 3D CNN training module which takes labelled sample 3D data and trains a CNN (unless specified otherwise, CNN will indicate a 2D or 3D CNN).

The trained CNN model is used in the CNN evaluation module 43 to test all training samples or additional labelled samples for which the model has not yet been trained. Because the sample data is labelled, the sample data can be divided in two parts: data that is correctly classified 44 by the model and data that is misclassified 45. The category of misclassified data 45 can be further subdivided into one of false negatives (e.g. a malignant nodule is not detected or misclassified as a benign nodule) or false positives (e.g. a non-nodule or a benign nodule is misclassified as a malignant nodule). Depending on the problem and the strengths and weaknesses, one of these subcategories can be more important than the other. For example, for a CNN that is intended to provide a number of candidate nodules to be visually checked by a radiologist, the false negatives are more important to eliminate. Thus, in an embodiment, only samples with false negatives are provided to the data generation module. In another embodiment of the invention, only samples with false positives are provided to the data generation module 46.

Figure 5:
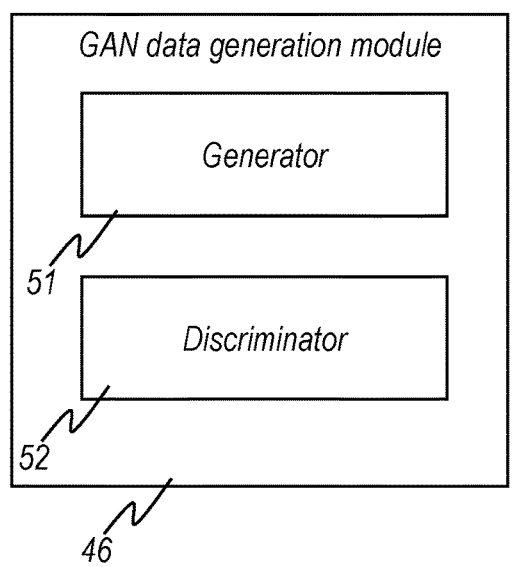
FIG. 5 schematically shows a data generation module according to an embodiment of the invention.

The data generation module 46 uses, in this example, a GAN or DCGAN to generate one or more further training samples 47 that look similar to one of the misclassified data samples. A GAN or DCGAN consists of a generative network 51 (hereafter: "generator") and a discriminative network 52 (hereafter "discriminator"), as shown in FIG. 5. The generative network 51 is trained to map from a so-called latent space to a particular data distribution of interest, and the discriminative network 52 is simultaneously trained to discriminate between instances from the basic data samples and synthesized instances produced by the generator 51. The generative network's training objective is to increase the error rate of the discriminative network by producing sample data that appears to be part of the misclassified data set 45.

According an embodiment of the invention, the selected misclassified samples 45 are the training data for the discriminator. Training the discriminator thus involves presenting the discriminator with samples from the misclassified data set 45 ("genuine" samples) and samples synthesized by the generator 51 ("false" samples). The discriminator will be trained to distinguish genuine from false samples, while the generator will be trained to generate, starting from a randomized input from a predefined latent space, to generate samples which the discriminator will consider genuine. The generator 51 may be a deconvolutional neural network and the discriminator 52 may be a convolutional neural network.

Referring once again to FIG. 4, as an example for every sample in a set 44 of N misclassified samples, M further training samples are generated, giving a total of N·M further training samples 47. The thus generated further samples are provided to the training module 42 to improve the training of the CNN.

Figure 6:
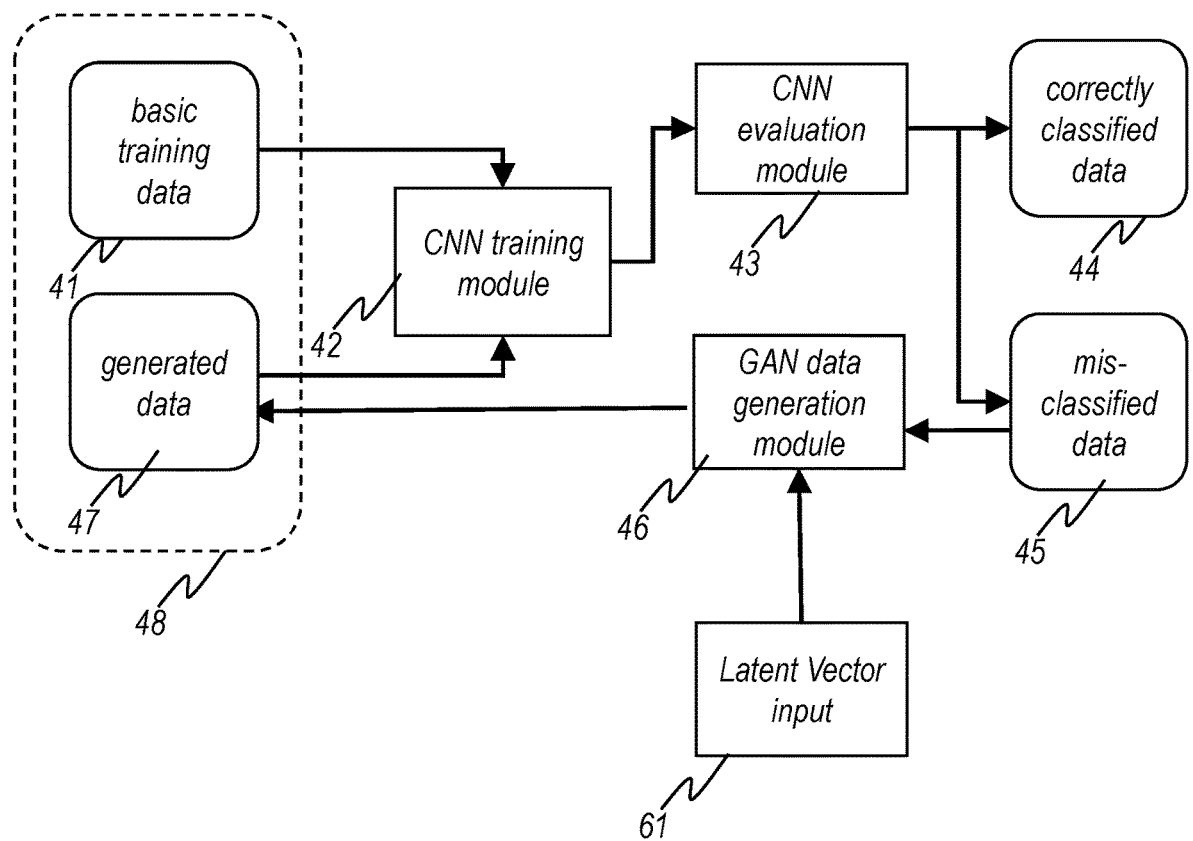
FIG. 6 schematically shows a further system according to embodiments of the disclosed subject matter.

FIG. 6 shows a further example implementation of the method described in connection with FIG. 3. The key difference with FIG. 4 is that now a Latent Vector input module 61 is added. There is a class of generative models which take as input a vector from a so-called latent space or latent Z space. The vector determines what type of image will be generated. The earlier mentioned GAN and DCGAN are an example of such a generative model. The latent (Z) space is a low-dimensional manifold that encodes morphological features in the generated image data.

Figure 7:
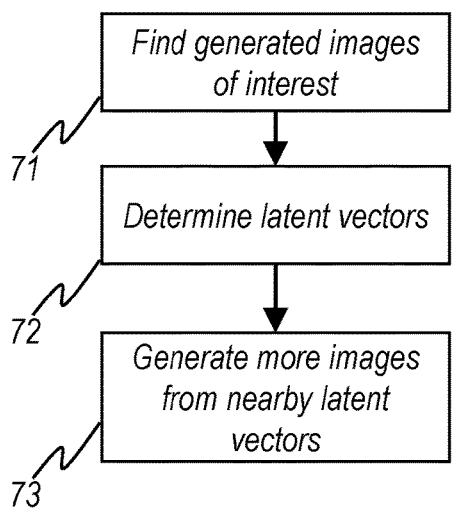
FIG. 7 schematically shows a method for controlling generated image data.

As a specific example, a radiologist may want to generate more glassy or spiky nodules, in order to improve the sensitivity of the CNN for those types of nodules. FIG. 7 schematically shows such an approach. First, in step 71, the radiologist finds among a set of images generated by the generation module 46 one or more images of interest. For example, images that exhibit the "glassy" or "spiky" properties of interest. Then the corresponding latent vector(s) is/are determined in step 72. Finally, in step 73 more images of interest are generated by exploring vectors nearby (by any suitable latent space metric) the determined latent vectors.

A slightly different approach is to generate latent vectors of interest from scratch. In order to be able to do this, some basic understanding of the latent space of the particular generative model is needed. In many cases, there is a known relation between the latent space and points in the image space, so that for example it is possible to "draw a nodule" in the low-dimensional manifold that is the latent space so that a similar looking nodule (in much more detail) is generated in the generated image data space.

In the foregoing description of the figures, aspects of the disclosure have been described with reference to specific embodiments. It will, however, be evident that various modifications and changes may be made thereto without departing from the scope of the disclosure as summarized in the attached claims.

In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims.

It is also noted that when items are presented in a single drawn box in the figure, this is but a logical representation. In many real-world implementations, a plurality of such "boxes" can be implemented in a single chip or server, or functionality which is represented in a single box may be distributed (e.g. parallelized) over a number of different platforms. The skilled person is aware of such minor variations that are open to the implementer of this disclosure. The attached claims are not to be read as limited to specific segmentation of functionalities shown in the figures.

Combinations of specific features of various aspects of the disclosure may be made. An aspect of the disclosure may be further advantageously enhanced by adding a feature that was described in relation to another aspect of the disclosure.

It is to be understood that the disclosure is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. Method for creating a model for classifying a data point in imaging data representing measured intensities, the method comprising:
    training a model using a first labelled set of imaging data points;
    determining at least one first image part in the first labelled set which the model incorrectly classifies;
    generating second image parts similar to at least one image part;
    further training the model using the second image parts, wherein
    the imaging data is 3-dimensional (3D) pixel data and the second image parts comprise 3D pixel data,
    the second image parts are generated by a generator model taking a latent vector as input, and
    the latent vector is determined corresponding to image part properties of interest.

2. The method according to claim 1, wherein the model is a convolutional neural network (CNN).

3. The method according to claim 2, wherein the model is a 3D convolutional neural network (CNN).

4. The method according to claim 1, wherein the model classifies every point in the imaging data.

5. The method according to claim 1, wherein the second image parts are generated by a Generative Adersarial Network (GAN).

6. The method according to claim 1, wherein the at least one first image part in the first labelled set which the model incorrectly classifies, is classified as a false negative.

7. Computation device comprising a processor in communication with a storage, the computation device configured for classifying a data point in imaging data representing measured intensities, by:
    training a model using a first labelled set of imaging data points;
    determining at least one first image part in the first labelled set which the model incorrectly classifies;
    generating second image parts similar to at least one image part;
    further training the model using the second image parts, wherein
    the imaging data is 3-dimensional (3D) pixel data and the second image parts comprise 3D pixel data,
    the second image parts are generated by a generator model taking a latent vector as input, and
    the latent vector is determined corresponding to image part properties of interest.

8. The computation device according to claim 7, wherein the model is a convolutional neural network (CNN).

9. The computation device according to claim 8, wherein the model is a 3D convolutional neural network (CNN).

10. The computation device according to claim 7, wherein the model classifies every point in the imaging data.

11. The computation device according to claim 7, wherein the second image parts are generated by a Generative Adversarial Network (GAN).

12. The computation device according to claim 7, wherein the at least one first image part in the first labelled set which the model incorrectly classifies, is classified as a false negative.

13. Non-transitory computer readable medium comprising computer instructions for implementing the method according to claim 1.

* * * * *